(12) United States Patent
Barber et al.

(10) Patent No.: US 9,892,165 B2
(45) Date of Patent: *Feb. 13, 2018

(54) PERFORMING BATCHES OF SELECTIVE ASSIGNMENTS IN A VECTOR FRIENDLY MANNER

(71) Applicant: International Business Machines Corporation, Armonk, NY (US)

(72) Inventors: Ronald J. Barber, San Jose, CA (US); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/797,259

(22) Filed: Jul. 13, 2015

(65) Prior Publication Data

US 2015/0324427 A1 Nov. 12, 2015

Related U.S. Application Data

(63) Continuation of application No. 13/756,438, filed on Jan. 31, 2013, now Pat. No. 9,171,029.

(51) Int. Cl.
*G06F 17/10* (2006.01)
*G06F 17/30* (2006.01)

(52) U.S. Cl.
CPC .. *G06F 17/30495* (2013.01); *G06F 17/30315* (2013.01); *G06F 17/30528* (2013.01); *G06F 17/30554* (2013.01)

(58) Field of Classification Search
None
See application file for complete search history.

(56) References Cited

U.S. PATENT DOCUMENTS

| 5,706,495 | A | 1/1998 | Chadha et al. |
| 6,038,392 | A | 3/2000 | Ashar et al. |
| 9,171,029 | B2 * | 10/2015 | Barber ............ G06F 17/30315 |
| 2009/0171999 | A1 | 7/2009 | McColl et al. |
| 2012/0102060 | A1 | 4/2012 | Kulkarni et al. |
| 2013/0042090 | A1 | 2/2013 | Krashinsky |
| 2013/0083619 | A1 * | 4/2013 | Jeon ..................... G11C 16/10 365/230.08 |
| 2014/0214912 | A1 * | 7/2014 | Barber ............ G06F 17/30315 708/490 |
| 2015/0324427 | A1 * | 11/2015 | Barber ............ G06F 17/30315 707/722 |

* cited by examiner

*Primary Examiner* — David H Malzahn
(74) *Attorney, Agent, or Firm* — Lieberman & Brandsdorfer, LLC

(57) ABSTRACT

Embodiments of the invention relate to processing queries. A query operation to be performed on a table of data is translated into a series of bit level logical operations using expansion and/or saturation operations. A mask is created from the series of bit level logical operations. This mask is then simultaneously applied to multiple rows from the table of data.

18 Claims, 6 Drawing Sheets

US 9,892,165 B2

1

PERFORMING BATCHES OF SELECTIVE ASSIGNMENTS IN A VECTOR FRIENDLY MANNER

CROSS REFERENCE TO RELATED APPLICATION(S)

This application is a continuation patent application claiming the benefit of the filing date of U.S. Pat. No. 9,171,029 filed on Jan. 31, 2013 and titled "Performing Batches of Selective Assignments In A Vector Friendly Manner", which is hereby incorporated by reference.

BACKGROUND

The invention relates to performing query functions at the vector level. More specifically, the invention relates to using binary arithmetic operations to simultaneously compute results of conditional expression evaluation at the vector level.

Databases are types of data repositories in computerized information storage and retrieval systems. Data housed in a database is structured into tables. A database query supports formulation of relational operations on the tables. Operators are provided in the supporting query language, known herein as structured query language (SQL), to allow data manipulation. Queries may come from users, application programs, or remote systems. A query may specify a specific location, such as, a table or a column in a database to retrieve data from, how to join columns from multiple tables, and conditions that must be satisfied for a particular data record to be included in a query result set.

A column oriented database management system stores content by column, also known as column store. Data that supports a query operation is generally found in vector format. Prior art techniques for performing SQL function evaluation on column stores do not take into account the layout of the data. Specifically, the prior art queries employ decision making logic, e.g. branches, and as such do not leverage the column store layout for efficient processing of queries.

SUMMARY

The invention comprises a method, system, and computer program product for using binary arithmetic operations to simultaneously compute results of conditional expression evaluation at the vector level.

In one aspect, a table of input data is received, and an operation to be performed on the table of input data is received. One or more of the columns of the input data is a Boolean column of input data representation of a condition, and one or more columns of the input data is a non-Boolean column of input data representation of condition values. A function is performed on a subset of two or more columns in the table of input data. The performed functions include saturating the Boolean column of input data into a mask in order to perform a logic operation, translating the function into a series of bit level logic operations on both the non-Boolean column input data and saturated values of Boolean input, and performing the translated function across the table of input data.

These and other features and advantages will become apparent from the following detailed description of the presently preferred embodiment(s), taken in conjunction with the accompanying drawings.

2

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
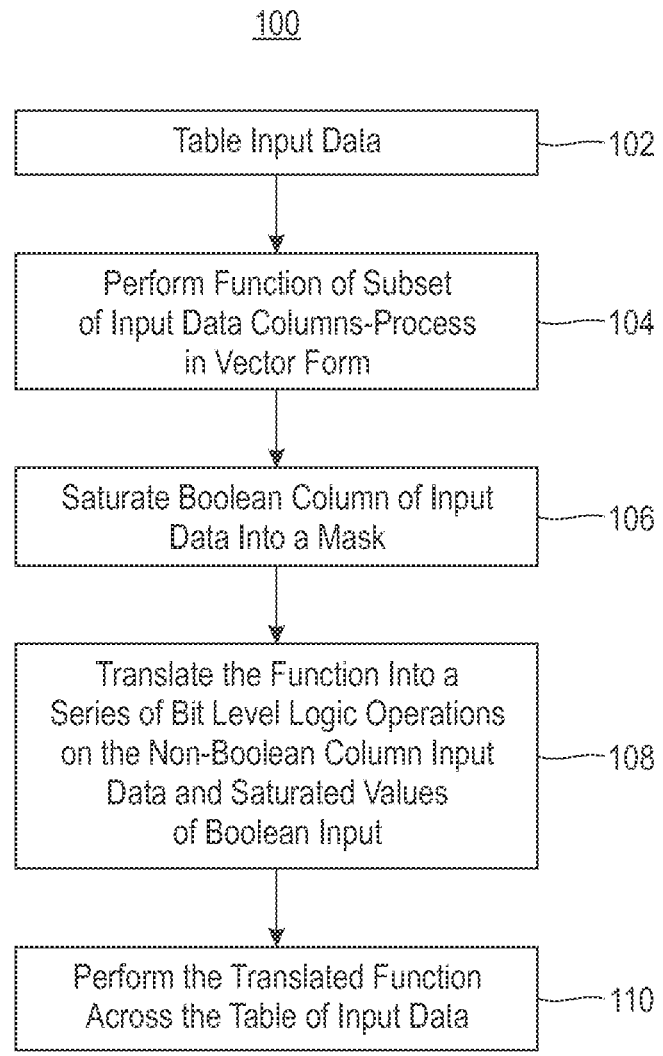
FIG. 1 depicts a flow chart illustrating a process for translating a computer language defined operation to be performed on a received table of input data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and a director. A manager and/or a director may be implemented in programmable hardware devices such as field programmable gate arrays, programmable array logic, programmable logic devices, or the like. The managers and/or director may also be implemented in software for processing by various types of processors. An identified manager and/or director of executable code may, for instance, comprise one or more physical or logical blocks of computer instructions which may, for instance, be organized as an object, procedure, function, or other construct. Nevertheless, the executables of an identified manager and/ or director need not be physically located together, but may comprise disparate instructions stored in different locations which, when joined logically together, comprise the managers and/or director and achieve the stated purpose of the managers and/or director.

Indeed, a manager and/or director of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Embodiments of the invention are directed to a method, system, and computer program product for bit masking solutions to allow a unique exploitation of performance on modern processors. Simple bit level logic employing logical operators such as AND, OR, and NOT, are used in conjunction with an expansion or saturation operation to build a mask, which then may be applied to multiple rows of output simultaneously. The operations described in detail below are cache friendly, vector processing friendly, and exploit large register widths, as well as processor pipelining and SIMD techniques. Accordingly, the operations exploit streamlining, e.g. removal conditional branching, by utilization of saturation when applied to vectors or collections of values.

FIG. 1 is a flow chart (100) illustrating a process for translating a computer language defined operation to be performed on a received table of input data (102). The received input data includes at least one column of Boolean input data and at least one column of non-Boolean input data. Each table of received input data includes a plurality of rows and columns. A function is performed on a subset of the columns in the table of input data (104). The function is applied to the input data and is processed in vector form. The process includes three primary components, including: saturating the Boolean column of input data into a mask in order to perform a logic operation (106), translating the function into a series of bit level logic operations on both the non-Boolean column input data and saturated values (mask) of Boolean input (108), and performing the translated function across the table of input data (110). In one embodiment, the saturation includes an expansion to the size of bits in each value. The saturation operation transforms the Boolean input vector into a mask by means of replicating each bit in the Boolean vector to be the binary width of the input value thus enabling it to be used as a traditional mask in conjunction with Boolean operations. Once the mask is built, it is applied to multiple rows, and in one embodiment it is a simultaneous application on two or more rows. The processing of the data shown herein takes place in vector form and is performed without conditional branching. A non-Boolean results column is produce as a result of the operation. Accordingly, binary arithmetic operations are used to perform traditional branching operations to produce a non-Boolean results column.

The translation of the function into a series of bit level logic operations supports simultaneous application of the bit level operations to multiple rows from the table of input data. In one embodiment, the translation of the function includes use of a conditional expression, and optionally using a NULL indicator as a condition within the conditional expression, or a warning and an error related to an instance of the column input data, as a condition within the conditional expression. Accordingly, the process shown herein is a bit masking solution that exploits processor performance.

In SQL there are different forms of expressions, including for example a CASE statement, a COALESCE statement, and a SUM statement. The CASE statement is used to provide if-then-else type of logic to SQL. More specifically, the CASE statement evaluates a list of conditions and returns one of multiple possible result expressions. The COALESCE statement is used to return the first non-NULL expression among its arguments. The SUM statement is used to provide a summation of results. Each of these exemplary statements is described in detail below as applied to the process detailed in FIG. 1.

Figure 2:
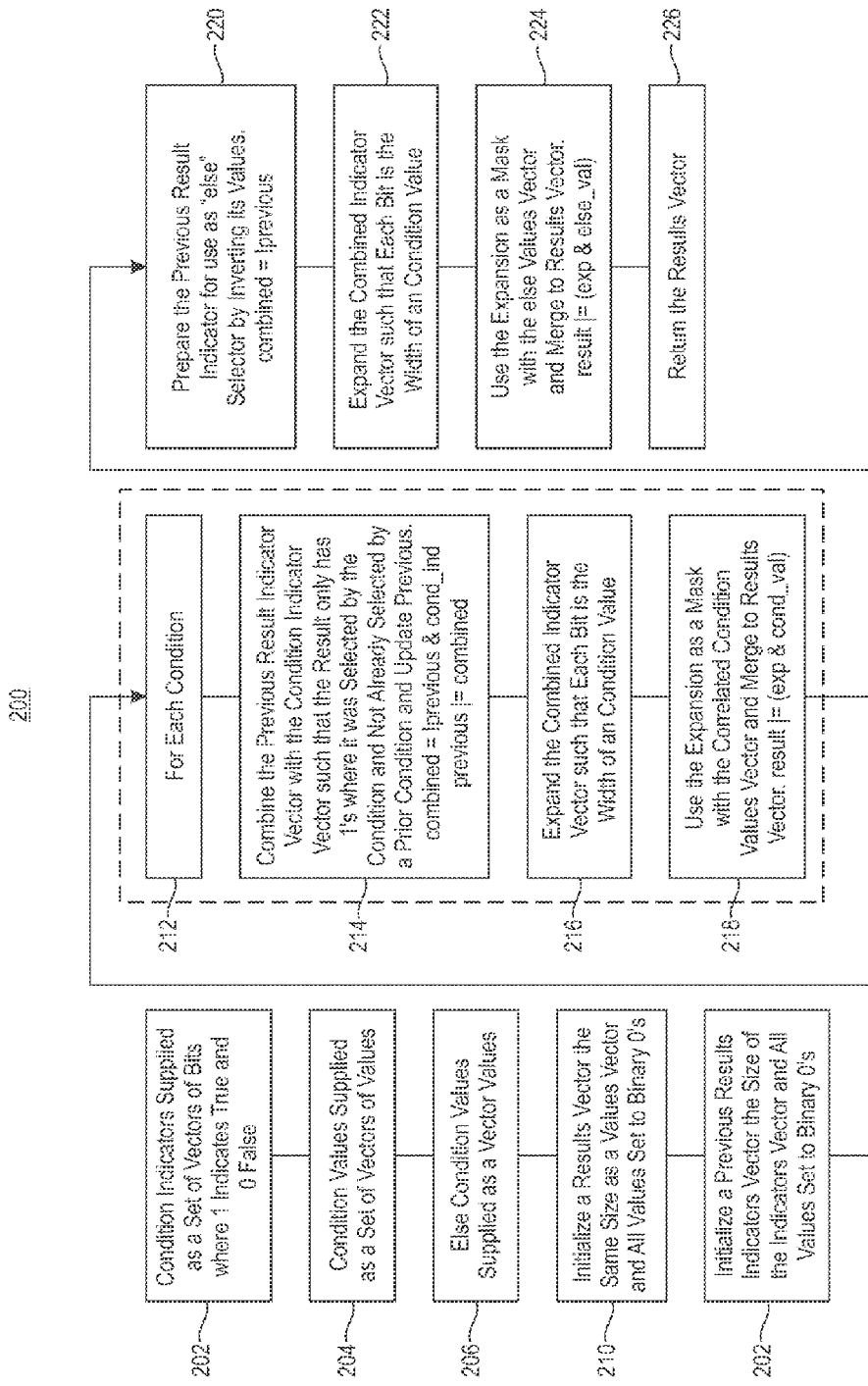
FIG. 2 depicts a flow chart illustrating processing a CASE statement.

FIG. 2 is a flow chart (200) illustrating processing a CASE statement. As shown, condition indicators are supplied as a set of vectors of bits, where 1 indicates true and 0 indicates false (202), i.e. a column of Boolean input data, and condition value are supplied as a set of vectors of values (204), i.e. a column of non-Boolean input data. In addition, Else condition values are supplied as a vector of value (206). Following receipt of the input data, a results vector is initialized (208). The results vector at step (208) is initialized the same size as a values vector and all values are set to binary zeros. In addition, a previous results indicators vector is initialized (210). The previous results vector initialization includes the size of the indicators vector and all values being set to binary zeros. Accordingly, steps (202) and (204) pertain to receipt of input data, and steps (206) and (208) pertain to initialization of the results vector and the previous results vector, respectively.

Following step (210), a loop is executed to simultaneously perform a plurality of operations at the vector level to support the CASE statement. As shown, the loop includes three steps for each condition indicator paired with a condition value (212). The first step (214) pertains to translating the Boolean logic. The previous results indicator vector is combined with the condition indicator vector such that the result only has binary ones where it was selected by the condition and not already selected by a prior condition and previously updated. Following the combining at step (214), the translation function expands the combined indicator vector such that each bit is the width of a condition value (216), e.g. building the mask to be applied to multiple rows of output simultaneously. Thereafter, the expansion is used as a mask with the correlated condition values vector and merged with the results vector (218). Accordingly, the simultaneous processing at steps (214)-(218) is applied for each condition indicator pair with a condition value.

When the "for loop" is complete, the previous result indicator is prepared for use as an "else" selector by inverting the indicator's values (220). The combined indicator vector is expanded such that each bit is the width of a condition value (222). The expansion is used as a mask with the "else" values vector and merged with the results vector (224). The actions at steps (220)-(224) take place simultaneously. Following step (224), the results vector is returned (226). Accordingly, the CASE statement produces one set of values in a results vector by translating the function into a series of bit level logic operations on both the non-Boolean column input data and saturated values of Boolean input, and simultaneously applying the bit level logic operations to multiple rows from the table of data.

Figure 3:
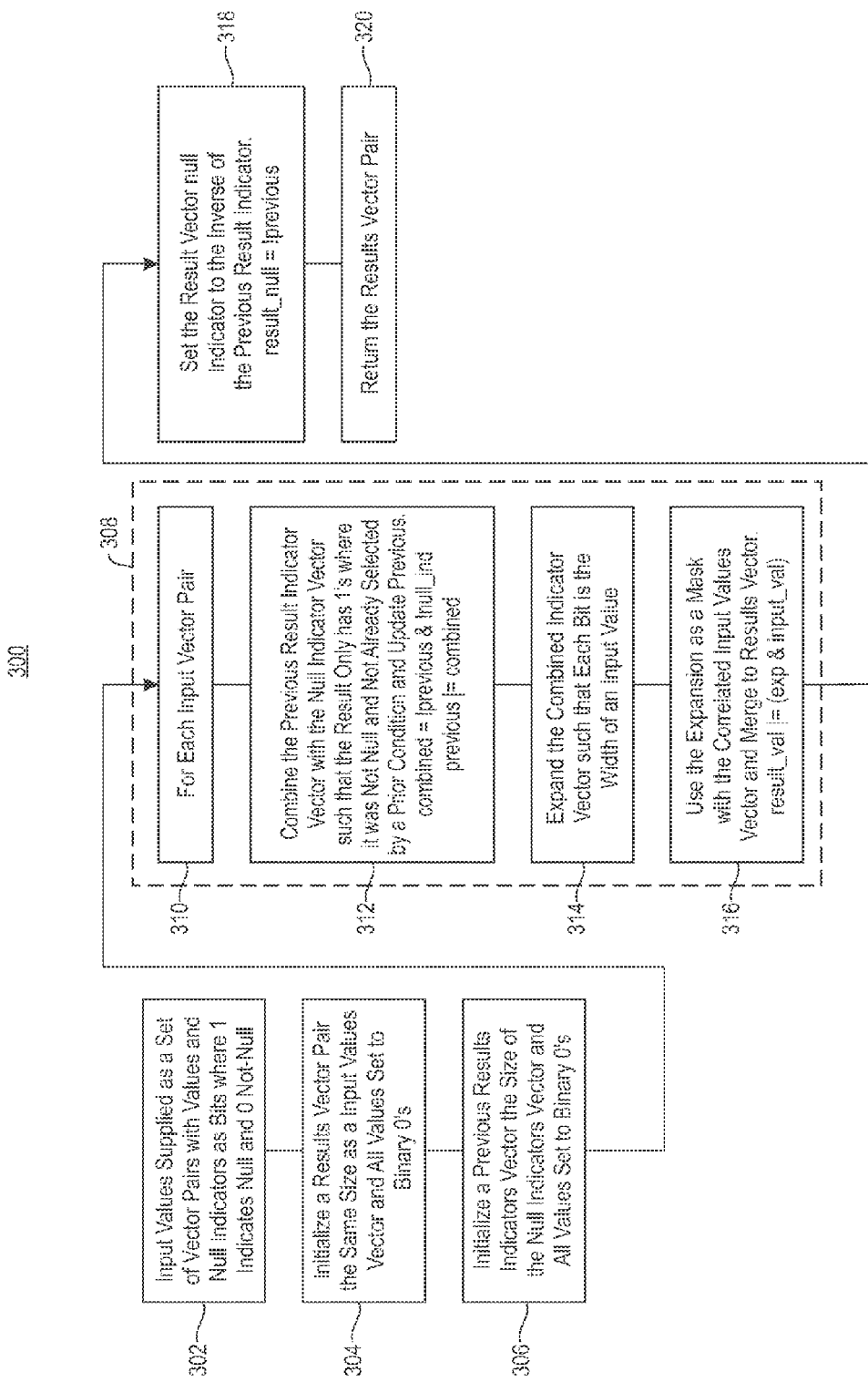
FIG. 3 depicts a flow chart illustrating processing COALESCE statement.

FIG. 3 is a flow chart (300) illustrating processing a COALESCE statement. As shown, Boolean and non-Boolean input values are supplied as a set of vector pairs with values and null indicators as bits where 1 indicates null and 0 indicates not-null (302). Following receipt of the input data, a results vector pair of the same size as the input values vector is initialized and all values are set to binary zeros (304). In addition, a previous results indicator vector is initialized (306). The previous results vector initialization includes the size of the null indicator vector and all values being set to binary zeros. Accordingly, step (302) pertains to receipt of input data, and steps (304) and (306) pertain to initialization of the results vector and the previous results vector, respectively.

Following step (306), a loop is executed to simultaneously perform a plurality of operations at the vector level to support the COALESCE statement. As shown, the loop (308) includes three steps for each input vector pair (310). The first step (312) pertains to translating the Boolean logic. The previous results indicator vector is combined with the null indicator vector such that the result only has binary ones where it was not null and not already selected by a prior condition and previous update. Following the combining at step (312), the combined indicator vector is expanded such that each bit is the width of an input value (314), e.g. building the mask to be applied to multiple rows of output simultaneously and to turn what we do not want to copy to binary zero. Thereafter, the expansion is used as a mask with the correlated input values vector and merged to the results vector (316). Accordingly, the simultaneous processing at steps (312)-(316) is applied for each input vector pair.

When the "for loop" is complete, the result vector null indicator is set to the inverse of the previous result indicator (318). Following step (318), the results vector pair is returned (226). Accordingly, the COALESCE statement produces one set of values in a results vector by translating the function into a series of bit level logic operations on both the non-Boolean column input data and saturated values of Boolean column input data, and simultaneously applying the bit level logic operations to multiple rows from the table of data.

Figure 4:
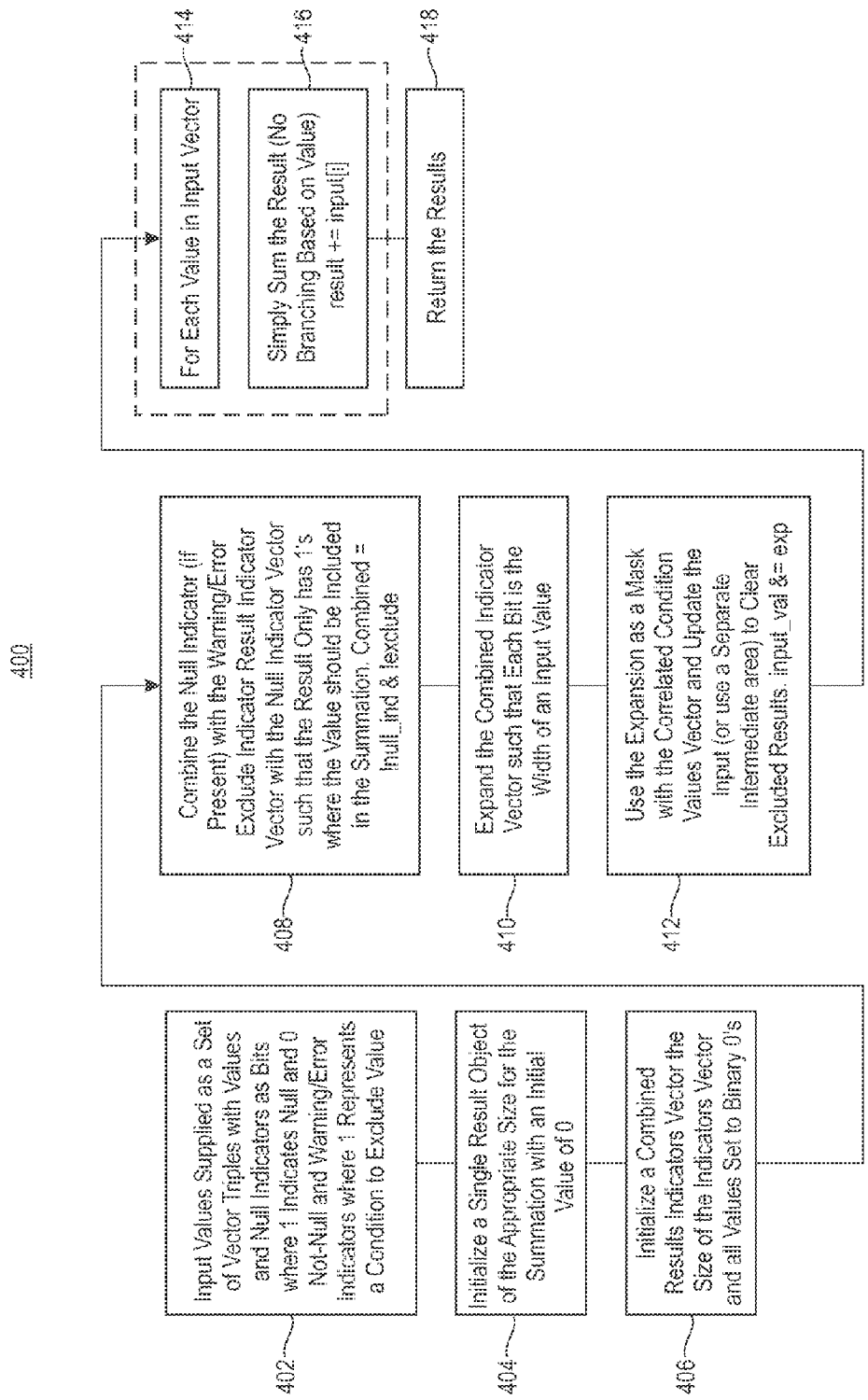
FIG. 4 depicts a flow chart illustrating processing a SUM statement.

FIG. 4 is a flow chart (400) illustrating processing a SUM statement. As shown, input values are supplied as a set of vector triples with values and null indicators as bits where binary one indicates null and binary zero indicates not-null, and null and error are combined into a single Boolean value (402), e.g. the Boolean value is a composite. Following receipt of the input data, a single result object of an appropriate size for the summation with an initial value of the input value vector is optionally initialized (404). In addition, a combined results indicator vector is initialized to the size of the indicators vector and all values are set to binary zeros (406). Accordingly, step (402) pertains to receipt of input data, and steps (404) and (406) pertain to initialization of the vectors, respectively.

Following step (406), the null indicator, if present, is combined with the warning and error exclude indicator result indicator vector with the null indicator vector such that the result only has binary ones where the value should be included in the summation (408). Following the combining at step (408), the combined indicator vector is expanded such that each bit is the width of an input value (410), e.g. building the mask to be applied to multiple rows of output simultaneously. Thereafter, the expansion is used as a mask with the correlated condition values vector and the input is updated to clear excluded results from a binary point of view (412).

Following step (412), the results are summed up in a simultaneous manner without a branch. For each value in the input vector (414), the result is summed based on value and without branching (416). Following step (416), the results vector pair is returned (418). Accordingly, the SUM statement produces one set of values in a results vector by simply summing the result vector without branching.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
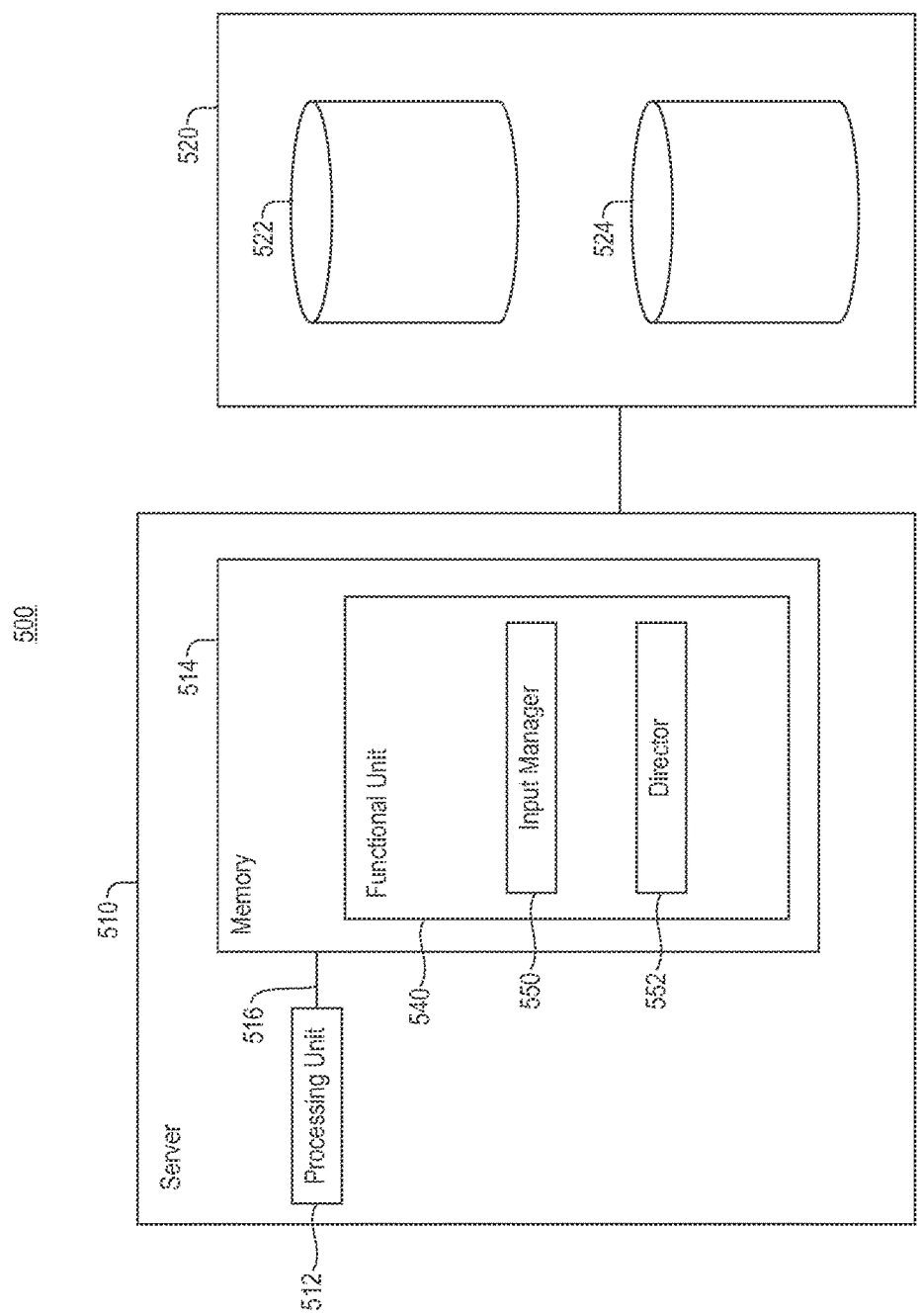
FIG. 5 depicts a block diagram illustrating a system having tools to support the binary arithmetic operations.

As shown in FIGS. 1-4, a method is provided to support translation of a function into a series of bit level logic operations that supports simultaneous application of the bit level operations to multiple rows from the table of input data, and specifically, a bit masking solution that exploits processor performance. Referring now to FIG. 5, FIG. 5 is a block diagram (500) illustrating a system having tools to support processing of input data. A database system runs on one or more servers. For purposes of description, the system is shown herein with one server (510), although in another embodiment the system may be shown with two more servers. The server (510) includes a processing unit (512) in communication with memory (514) across a bus (516). A data storage system (520) is in communication with the server (510) across a bus or a network. The data storage system (520) is shown with two storage devices (522) and (524), each which may be employed to store database tables.

A functional unit (540) is provided local to the server (510) to support processing of queries submitted to the database. The functional unit (540) is in communication with the processing unit (512). The functional unit (540) is provided with tools for supporting query processing. The tools include an input manager (550) and a director (552). The input manager (550) functions to receive a table of input data, and to receive an operation to be performed on the table of input data. One or more of the columns of the input data are a Boolean column of input data representation of a condition, and one or more of the columns of the input data are a non-Boolean column of input data representation of condition values. The director (552) is in communication with the input manager (550). The director (552) performs a function on a subset of two or more columns in the table of input data. Specifically, the director (552) saturates the Boolean column of input data into a mask in order to perform a logic operation, translates the function into a series of bit level logic operations on both the non-Boolean column input data and saturated values of Boolean input, and performs the translated function across the table of input data. In one embodiment, the director (552) simultaneously applies the bit level logic operations to multiple rows from the table of data. Accordingly, the input manager (550) and the director (552) support efficient use of cache and vector processing, and exploit large register width as well as CPU pipelining and SIMD techniques.

As identified above, the input manager (550) and the director (552), hereinafter referred to as tools, function as elements to support processing of bit level logic operations to multiple rows from the table of data. The tools (550) and (552) are shown residing in memory (514) local to the server (510) and in communication with the data storage system (520). However, the tools (550) and (552) may reside as hardware tools external to memory (514), or they may be implemented as a combination of hardware and software. Similarly, in one embodiment, the tools (550) and (552) may be combined into a single functional item that incorporates the functionality of the separate items. In one embodiment, the tools they may be collectively or individually distributed across a network or multiple machines and function as a unit. Accordingly, the tools may be implemented as software tools, hardware tools, or a combination of software and hardware tools.

Figure 6:
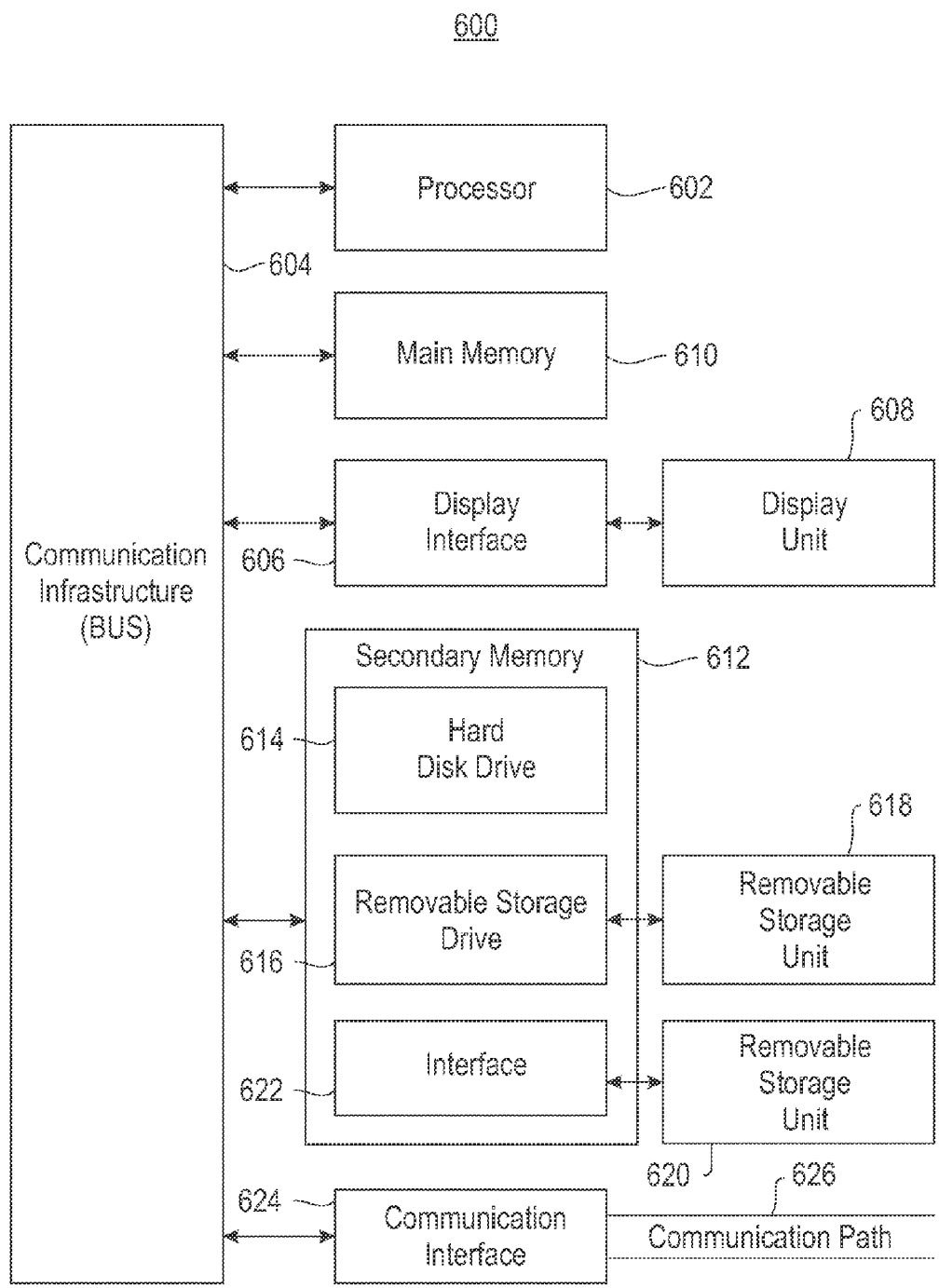
FIG. 6 is a block diagram showing a system for implementing an embodiment of the present invention.

Referring now to the block diagram of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by removable storage drive (616).

As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) is in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

What is claimed is:

1. A method comprising:
reading a table of data, including a Boolean column and a non-Boolean column;
receiving an operation to be performed on the table of data;
translating the received operation into a series of bit level logic operations;
creating a mask from the series of bit level logic operations; and
applying the mask to multiple rows from the table of data including from the Boolean column and the non-Boolean column, the application including producing at least one results column.

2. The method of claim 1, wherein applying the mask includes simultaneously applying bit level logic to multiple rows of the table.

3. The method of claim 1, wherein translating the received operation utilizes binary arithmetic operations to perform branching.

4. The method of claim 1, wherein the operation includes an SQL CASE statement evaluating a list of conditions and returning one or more possible result expressions.

5. The method of claim 1, wherein the operation includes an SQL COALESCE statement evaluating a list of null indicators, and returning a non-NULL expression.

6. The method of claim 1, wherein the operation includes an SQL SUM statement evaluating a list of null indicators and a list of error indicators, and returning a summation of results.

7. A computer program product for performing batches of selective assignments, the computer program product comprising a non-transitory computer-readable storage medium having program code embodied therewith, the program code being executable by a processor to:
   read a table of data, including a Boolean column and a non-Boolean column;
   receive an operation to be performed on the table of data;
   translate the received operation into a series of bit level logic operations;
   create a mask from the series of bit level logic operations; and
   apply the mask to multiple rows from the table of data including from the Boolean column and the non-Boolean column, the application including to produce at least one results column.

8. The computer program product of claim 7, wherein applying the mask includes program code to simultaneously apply bit level logic to multiple rows of the table.

9. The computer program product of claim 7, wherein translating the received operation includes program code to perform branching by utilizing binary arithmetic operations.

10. The computer program product of claim 7, wherein the operation includes an SQL CASE statement evaluating a list of conditions, and returning one or more possible result expressions.

11. The computer program product of claim 7, wherein the operation includes an SQL COALESCE statement evaluating a list of null indicators, and returning a non-NULL result expression.

12. The computer program product of claim 7, wherein the operation includes an SQL SUM statement evaluating a list of null indicators and a list of error indicators, and returning a summation of results expression.

13. A system comprising:
   a processing unit in communication with data storage, the data storage having one or more tables of a database;
   a functional unit in communication with memory and the processing unit, the functional unit having tools to support processing of data, the tools comprising:
      an input manager to read a table of data, including a Boolean column and a non-Boolean column and to receive an operation to be performed on the table of data;
      a director in communication with the input manager, the director to perform a function on a subset of a plurality of columns in the table of input data, including the director to:
         translate the received operation into a series of bit level logic operations;
         create a mask from the series of bit level logic operations;
         apply the mask to multiple rows from the table of data including from the Boolean column and the non-Boolean column, the application including to produce at least one results column.

14. The system of claim 13, wherein applying the mask the director to simultaneously apply bit level logic to multiple rows of the table.

15. The system of claim 13, wherein translating the received operation includes the director to perform branching by utilizing binary arithmetic operations.

16. The system of claim 13, wherein the operation includes an SQL CASE statement evaluating a list of conditions, and returning one or more possible result expressions.

17. The system of claim 13, wherein the operation includes an SQL COALESCE statement evaluating a list of null indicators, and returning a non-NULL result expression.

18. The system of claim 13, wherein the operation includes an SQL SUM statement evaluating a list of null indicators and a list of error indicators, and returning a summation of results expression.

* * * * *